United States Patent [19]
Goreta et al.

[11] Patent Number: 5,963,643
[45] Date of Patent: *Oct. 5, 1999

[54] METHOD AND SYSTEM FOR THE TRANSFER OF INFORMATION BETWEEN TWO POPULATIONS OF PERSONS, ONE NOMADIC AND THE OTHER SEDENTARY

[75] Inventors: Lucas Goreta, Annecy; Christian Duroux, Paris, both of France

[73] Assignee: Fintel S.A., Paris, France

[*] Notice: This patent issued on a continued prosecution application filed under 37 CFR 1.53(d), and is subject to the twenty year patent term provisions of 35 U.S.C. 154(a)(2).

[21] Appl. No.: 08/719,478

[22] Filed: Sep. 25, 1996

[30] Foreign Application Priority Data

Sep. 25, 1995 [FR] France .................................... 95 11413

[51] Int. Cl.$^6$ .................................................. H04M 1/00
[52] U.S. Cl. .................................................. 380/9; 380/49
[58] Field of Search .................................... 380/9, 49

[56] References Cited

U.S. PATENT DOCUMENTS

| | | | |
|---|---|---|---|
| 3,810,019 | 5/1974 | Miller | 325/40 |
| 4,313,207 | 1/1982 | Nardozza et al. | 455/1 |
| 4,899,365 | 2/1990 | Hove | 375/13 |
| 4,928,098 | 5/1990 | Dannhaeuser | 340/825.56 |
| 4,998,279 | 3/1991 | Weiss | 380/23 |
| 5,168,519 | 12/1992 | Scarinci et al. | 380/6 |
| 5,406,619 | 4/1995 | Akhteruzzaman et al. | 379/95 |
| 5,524,072 | 6/1996 | Labaton et al. | 380/24 |
| 5,583,933 | 12/1996 | Mark | 379/355 |

FOREIGN PATENT DOCUMENTS

| | | |
|---|---|---|
| 318 454 | 5/1989 | European Pat. Off. . |
| 2 705 853 | 12/1994 | France . |
| 20 01 669 | 7/1970 | Germany . |

OTHER PUBLICATIONS

J. L. Fike, et al., "Understanding Telephone Electronics," (H. W. Sans & Co., Indianapolis; 1983; pp. 2–5 through 2–10).

(List continued on next page.)

*Primary Examiner*—Gail O. Hayes
*Assistant Examiner*—Carmen White
*Attorney, Agent, or Firm*—Merchant, Gould, Smith, Edell, Welter & Schmidt, P.A.

[57] ABSTRACT

A method enabling two populations of persons, one being sedentary (for example a provider of long-distance services) and the other being nomadic (for example the customers of this provider of services) to exchange data in a sure and speedy manner, comprises the following steps:

portable objects are placed at the disposal of the persons belonging to the nomadic population, these objects having the credit card format and being customized by specific identifiers for each person and for each card, the card is used to transmit at least partially encrypted DTMF type brief acoustic identification signals which are received by means of the microphone of a standard telephone set and processed by means of the standard telephone set so that the resulting signal can be transmitted, through a telephone or computer network, to the data-processing service of at least one of the persons of the sedentary population, the signals coming from the card are processed by means of a specific software program whose parameters are a function of the characteristics of the card, its conditions of use in combination with the microphone of the telephone set, characteristics of the communications network for signals of a particular type corresponding to the identification data transmitted, the signals are decrypted and the data elements obtained after decryption are compared with the data elements, in the possession of the data-processing service, for the identification of the card and the holder of the card.

19 Claims, 4 Drawing Sheets

OTHER PUBLICATIONS

Patent Abstracts of Japan, vol. 9. No. 302 (E–362), Nov. 29, 1985 & JP A 60 141033 (Nippon Denki KK), Jul. 26, 1985.

Mar. 1989, Journal of the Audio Engineering Soc. (AES) vol. 37, No. 3, pp. 149–157, XP000098390 J.H. Hahn: "Analysis and Detection of Acoustically Coupled DTMF Signals".

Patent Abstracts of Japan, vol. 14, No. 362 (E–0960), Aug. 6, 1990 & JP A 02 126756 (Sharp Corp.), May 15, 1990.

Apr. 28–30, 1986, Speech Tech '86, New York, NY, USA, pp. 131–134, XP000570881, Lee C.H. et al.: "An integrated voice–controlled voice messaging system".

Mar. 1969, Siemens Zeitschrift, vol. 43, No. 3, Munich (DE), pp.121–135, XP002003686, Fischer et al.:"Modems für die parallelübertragung von daten über fernsprechwähl-netze". (listed on French Search Report for FR 520087.

METHOD AND SYSTEM FOR THE TRANSFER OF INFORMATION BETWEEN TWO POPULATIONS OF PERSONS, ONE NOMADIC AND THE OTHER SEDENTARY

BACKGROUND OF THE INVENTION

1. Field of the Invention

The field of the invention is that of the transfer of data through a telephone or computer communications network.

More specifically, the invention relates to a method and a system enabling two populations of persons, one being sedentary (for example a provider of long-distance services) and the other being nomadic (for example the customers of this provider of services) to exchange data in a sure and speedy manner.

The problem posed is that of enabling an authorized nomadic user to obtain remote access to the services offered by the provider of services while preventing a fraudulent person from claiming that he is authorized, has paid the corresponding fees or has not asked for the services debited to him.

2. Description of the Prior Art

To resolve this problem, it has been proposed to use access keys that the nomadic user generates by means of a multimedia terminal or piece of peripheral equipment connected to a telephone handset, for example by inserting a memory card into the peripheral equipment. These approaches, apart from their cost, are impractical and lengthy in their implementation for they imply the installation of peripheral equipment such as memory card readers. In fact, the problem posed cannot be effectively resolved if it is sought to resolve another problem simultaneously, namely that of designing a method and system that is convenient to use, speedy in its implementation and economical. For, once an application pertains to a large section of the public, facility of use and gain in time become major questions that cannot be set aside. More particularly, the attachment of the users to nomadic products having the size of a credit card that can be easily stowed into a wallet or card-holder implies the designing of methods and systems that implement nomadic objects with these dimensional characteristics.

SUMMARY OF THE INVENTION

These problems are resolved and these objectives are achieved according to the invention by means of a method comprising the following steps:

portable objects are placed at the disposal of the persons belonging to the nomadic population, these objects having the credit card format and being customized by specific identifiers for each person and for each card, said card is used to transmit at least partially encrypted DTMF type brief acoustic identification signals, the acoustic identification signals being transmitted by the card when it is activated by the person having it (a card of this kind has been described in the French patent No. 2 705 853 published on the 2nd of December 1994), said acoustic identification signals are received by means of the microphone of a standard telephone set and said signals are processed by means of the standard telephone set so that the resulting signal can be transmitted through a telephone or computer network, the signal is transmitted onwards through a telephone communications network to the data-processing service of at least one of the persons of the sedentary population.

Now the reduced size and the format of the card as well as the conditions of use of the card (such as the presence of ageing microphones, poor acoustic coupling between the card and the microphone, ambient noise, temperature, etc.) do not permit the onward transmission, in the present state of the art, of DTMF acoustic signals having a quality such that the signal received can always be exploited, as it is, by the vocal servers existing in the data-processing services. The implementation of a portable object having a credit card format therefore raises a problem that, up till now, has limited the use of such a technology.

To overcome this difficulty, the method according to the invention, in combination with the steps that have just been described, further comprises the following step:

the signals coming from the card (through the microphone, the standard telephone set, the communications network) are processed by means of a specific software program whose parameters are a function of the characteristics of the card, its conditions of use in combination with the microphone of the telephone set, specific characteristics of the acoustic identification signals, characteristics of the communications network for signals of a particular type corresponding to the identification data transmitted.

Thus, after processing, the signals that come from the card and are received by the data-processing services contain the data that the nomadic population wishes to transfer to the sedentary population.

The method according to the invention furthermore comprises the following steps:

the signals are decrypted and the data elements obtained after decryption are compared with the data elements, in the possession of the data-processing service, for the identification of the card and the holder of the card.

Thus, by means of this method, the provider of services is sure that the caller truly has an authentic card and not a data-processing decoy, and furthermore he has been able to identify the holder of the card as being a person entitled to use the services that he is offering. As a result, after the implementation of this sure and speedy process of identification, the persons of each of the two populations may exchange data in full security.

Advantageously, in one alternative embodiment, the method according to the invention is such that in order to determine the parameters of the specific software program that processes the signals coming from the card:

the card is used to transmit an acoustic signal predetermined to correspond to a calibrated signal, especially in frequency and in power, the received signal is analyzed by the data-processing service, in being compared with the calibrated acoustic signal, the parameters of the specific processing software program are deduced from this comparison.

The invention also relates to a system enabling two populations of persons, one sedentary (in particular a provider of long-distance services) the other nomadic (in particular the customers of this provider of services) to exchange data in a sure and speedy manner. This system has the characteristic of including means to implement the above-defined method and its alternative embodiments.

More particularly, the system according to the invention comprises:

portable objects placed at the disposal of the persons belonging to the nomadic population, said portable objects being cards with the credit card format that are customized by specific identifiers for each person and each card, each card comprising means for the transmission of at least partly encrypted DTMF type brief acoustic identification signals, the acoustic identification signals being transmitted by the card when it is activated by the person having is at his disposal, by means of at least one element accessible from the exterior of the card, a standard telephone set comprising:
   a microphone against which the person having the card at his disposal places this card when the acoustic identification signal is transmitted,
   means for the standard processing of said acoustic identification signals so that the resulting identification signal can be transmitted onwards to a distance, through a telephone communications network, by transmission means, a data-processing service comprising data-processing means at the disposal of at least one of the persons of the sedentary population, connected to the telephone communications network and liable to receive the identification signal coming from the telephone set.

The reduced size and the format of the card as well as the conditions of use of the card (such as the presence of ageing microphones, poor acoustic coupling between the card and the microphone, ambient noise, temperature, etc.) do not permit the onward transmission, in the present state of the art, of DTMF acoustic signals of a quality such that the signal received can always be exploited, as it is, by the vocal servers existing in the data-processing services. To overcome this difficulty, the system according to the invention is such that said data-processing means further comprise:

means for the processing of the signals coming from the card (through the microphone, the standard telephone set of the communications network) comprising a specific software program whose parameters are a function of the characteristics of the card, its conditions of use in combination with the microphone of the telephone set, characteristics of the communications network for signals of a particular type corresponding to the identification data transmitted. As a result, after processing, the signals that come from the card and are received by the data-processing services contain the data elements that the nomadic population wishes to transfer to the sedentary population.

Said data-processing means further comprise:
   means for the decryption of the signals making it possible, through these signals, to obtain the specific identifiers of the card and of the person holding the card,
   a database containing the references of the cards and of the persons having these cards at their disposal and their identification data,
   means for the comparison of the specific identifiers of the card and of the person holding the card with the identification data of the card and the person holding the card, contained in the database. As a result, after the implementation of this speedy and sure process of identification, the persons of each of the two populations may exchange data in full security.

Advantageously, according to one alternative embodiment, the system according to the invention is such that to determine the parameters of the specific software program that processes the signals coming from the card:
   the transmission means of the card send out a predetermined acoustic signal to correspond to a calibrated signal, especially in frequency and in power,
   the data-processing means of the data-processing service comprise means for the analysis of the signal received by the data-processing service and for the comparison of this signal with the calibrated acoustic signal.

In a first alternative embodiment of the system according to the invention, said means for the processing of the signals coming from the card are placed upline with respect to the other means forming the data-processing means.

In a second alternative embodiment of the system according to the invention, said means for the processing of the signals coming from the card are placed as resources for the other means forming the data-processing means.

In a third alternative embodiment of the system according to the invention, said means for the processing of the signals coming from the card are placed in a network with respect to the other means forming the data-processing means.

In a fourth alternative embodiment of the system according to the invention, said means for the processing of the signals coming from the card are integrated with the other means forming the data-processing means.

BRIEF DESCRIPTION OF THE DRAWINGS

Other features and advantages of the invention shall appear from the following description of four preferred embodiments of the invention, given as indicatory and non-restrictive examples, and from the appended drawings, of which.

MORE DETAILED DESCRIPTION

Figure 1:
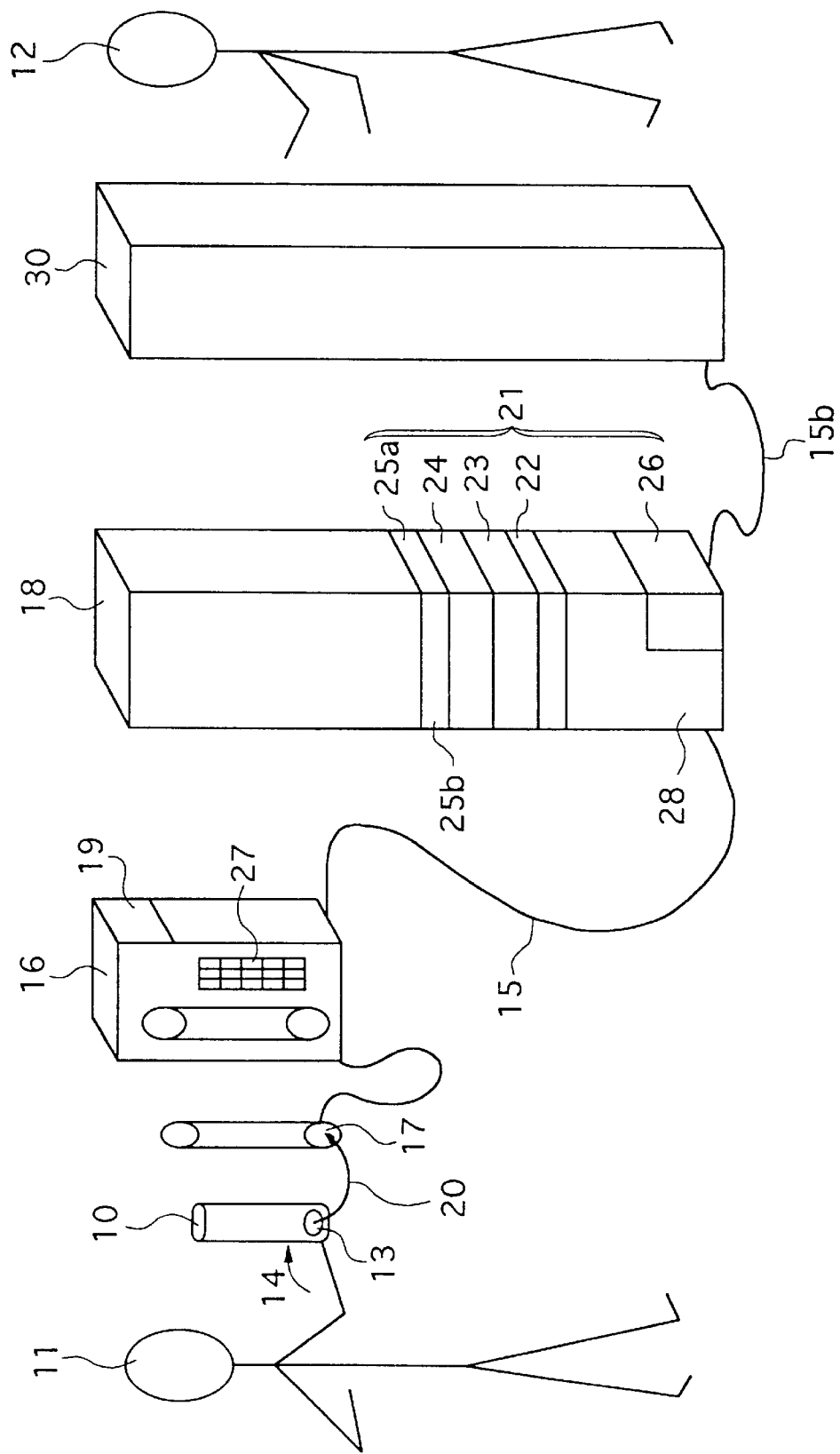
FIG. 1 shows a schematic view in perspective of the system according to the invention.

The system and method according to the invention are now presented with reference to FIG. 1. The system and method according to the invention enable each person 11 of the nomadic population using a telephone set 16 comprising a microphone 17 to obtain sure and speedy access to the services 30 offered to them by the persons 12 of the sedentary population (the provider of services 12). The telephone set 16, located at a distance from the data-processing services 18 of the provider of services 12, is connected to the telephone communications network 15.

The system comprises a card 10 with a credit card format customized by specific identifiers for each card and for each user 11. This card is placed at the disposal of the users by the provider of services 12. The card 10 comprises means 13 for the transmission of at least partially encrypted DTMF type brief acoustic identification signals 20.

These signals are sent when the sending means 13 are activated by the user by means of an element 14 accessible from the exterior of the card (not seen in the figure, as it is located on the other side of the card). The acoustic signals 20 are received by the microphone 17 of the telephone set against which the user places the card 10. The system also comprises means 19 for the onward transmission of the acoustic signals 20 located in the telephone set 16. These onward transmission means carry out the long-distance transmission of the signals, after processing, through the communications network 15, to the data-processing services 18 of the provider of services. The data-processing services, connected to the communications network 15, comprise data-processing means 21. The data-processing means 21 comprise:

means 22 to activate said onward transmission means 19 of the telephone set 16, means 28 for the processing of the signals coming from the card (through the microphone, the standard telephone set and the communications network), comprising a specific software 26 whose parameters are a function of the characteristics of the card 10, its conditions of use in combination with the microphone 17 of the telephone set 16, characteristics of the communications network 15 for signals of a particular type corresponding to the identification data elements transmitted.

In order to define the transfer function of the onward transmission line, namely in order to take account of the following characteristics in the specific software 26 of the signal processing means 28:

the quality of the microphone (damping, distortion, background noise), the characteristics of the telephone unit (amplification, limitations, band filtering), the ambient temperature of the place in which the card is used (implications for the frequencies sent out by the card and the distortions produced by the microphone and the line), the noise and quality of the line itself, the interruptions/cuts, echoes that occur frequently on long distance calls, the card transmits a predetermined acoustic signal to correspond to a signal calibrated to the precise characteristics, especially in frequency and in power.

The signal received, at the end of the line, by the data-processing service is compared with the predetermined calibrated acoustic signal according to precise characteristics. This comparison enables the data-processing means 21 to compute the parameters of the specific processing software 26. The main function of this software 26 relate to:

the linearization of the signal with respect to the highpass and lowpass filters, the computation of signal correlation for highly dampened signals and/or noise-immersed signals, the measurement and correction of the frequency drifts related to the ambient temperature of the place of transmission and the state of the transmitting device, the filtering of the mean noise, the correction of errors, the elimination of the echoes, the self-synchronization of the signals, the detection and interpretation of the pulses, the intelligent statistical analysis of the signals: voice/code discrimination, the detection of the amplification levels and/or limitation of the filters of the telephone sets with reconstitution of the clipped signal parts.

Thus, through these processing means 28 and the specific software program 26 located at the other end of the communications network 15 in the vicinity of the provider of services being telephoned, the users 11 have the possibility of using nomadic products 10 with the credit card format to which they are accustomed and which they can easily carry in their wallet or in the card holder. Furthermore, they can use standard telephone sets 16, of which about a billion units are available on the planet.

The data-processing means 21 also comprise:

means 24 for the decryption of the signals making it possible to obtain, from these signals, the specific identifiers of the card and of the card-holder, a database 23 containing the references of the card and of the persons having them and their identification data, means 25a for the comparison of the specific identifiers of the card and of the holder of the card with the identifying data of the card and of the person holding the card, contained in the database.

As a result, after the implementation of this speedy and sure process of identification, the persons of each of the two populations may exchange data elements in full security.

Preferably, the encryption means of the card and the decryption means of the data-processing services are designed in such a way that the acoustic signal varies at each operation (clock, operations counter, etc. as is described especially in the U.S. Pat. No. 4,998,279 and U.S. Pat. No. 4,298,098). After recording, it will not be possible for a fraudulent individual to make use, in any form whatsoever, of the acoustic signals to obtain identification by the data-processing services of the provider of services and profit from his services.

In order to increase the security of the system, in the alternative embodiment shown in FIG. 1, the system further comprises second comparison means 25b. These comparison means enable comparison of a confidential code personal to the user contained in the database with the confidential code sent out by the user. This code is sent out by means of a keyboard 27 associated with the telephone set 16 and/or the card 10 and transmitted to the data-processing means of the provider of services by the communications network 15. Thus, the provider of services is sure that the caller 11 is truly the person entitled to link up with his services. A stolen card cannot be used by the thief for lack of knowledge of the confidential code.

Referring to FIGS. 2, 3, 4 and 5, a description shall now be given of the four embodiments of the means 28 for processing the signals that come from the card and are conveyed by the communications network. The same references have been used in these figures to designate the elements and means that have been described with reference to FIG. 1.

Figure 2:
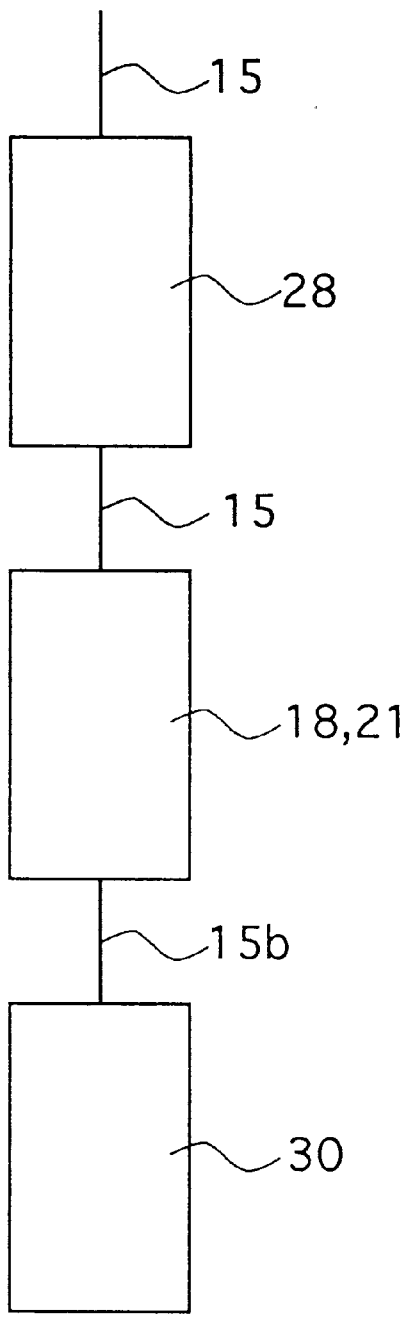
FIG. 2 gives a view, in the form of a block diagram, of a first alternative embodiment such that said means for the processing of the signals coming from the card are placed upline with respect to the other means forming the data-processing means.

According to a first embodiment shown in FIG. 2 in the form of a block diagram, the means 28 for the processing of the signals coming from the card are placed upline with respect to the other means forming the data-processing means 21 (frontally on the vocal server 18, 30). The acoustic signals are processed by the means 28 and restored, after regeneration, through the telephone line for example: they are restored in ASCII type digital form or any other norm that can be directly used by a computer, or in the form of standard DTMF signals that can be used by the digital signal processor (DSP) of the vocal server placed downline. This arrangement makes it possible not to modify any element of the data-processing means 21 (of the vocal server placed downline). However, it calls for an equal number of telephone lines at input and at output of the signal processing means 28.

Figure 3:
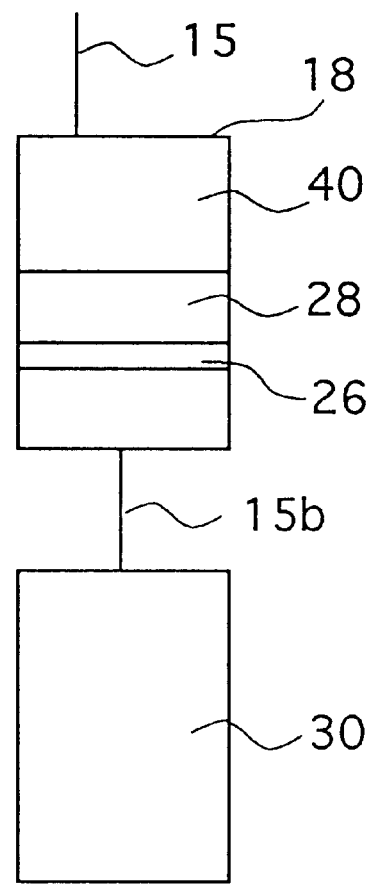
FIG. 3 gives a view, in the form of a block diagram, of a second alternative embodiment such that said means for the processing of the signals coming from the card are placed in the form of resources with respect to the other means forming the data-processing means.

According to the second embodiment shown in FIG. 3, in the form of a block diagram, the means 28 for the processing of the signals coming from the card are placed as resources for the other means forming the data-processing means 21 (vocal server). In this case, the vocal server receives the calls but uses the signal processing means 28 as a system resource whenever this is necessary. This arrangement enables the use of the telephone line switch-over and management system 40 of the vocal server 18. The vocal server transfers a PCM or ADPCM type digitized acoustic file to the resource. The signal processing means 28 take the form of an electronic card incorporating a computer and a software program. Should the number of lines be small, the signal processing means 28 consist of a software program. They then send an ASCII type of signal or another type of signal to the vocal server 18.

Figure 4:
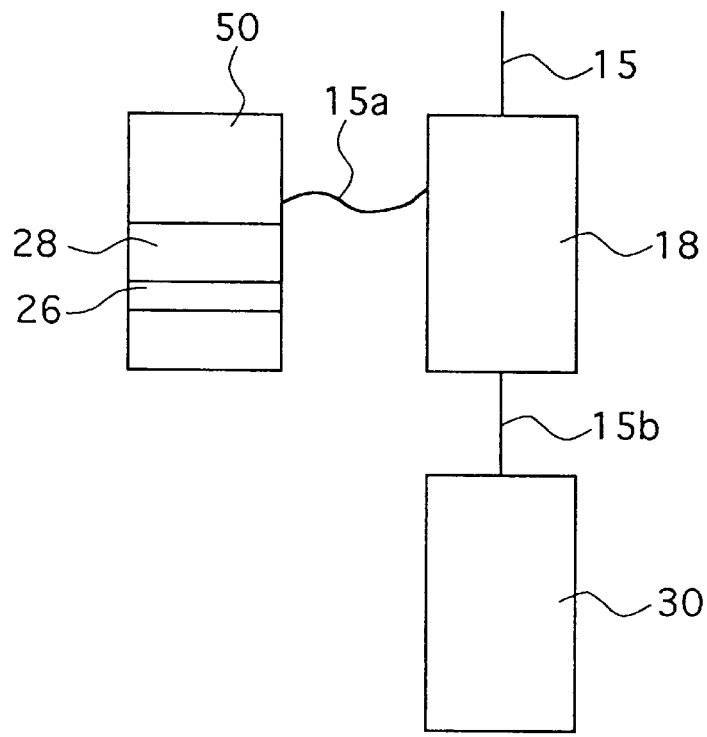
FIG. 4 gives a view, in the form of a block diagram, of a third alternative embodiment such that said means for the processing of the signals coming from the card are placed in a network with respect to the other means forming the data-processing means.

According to the third embodiment shown in FIG. 4, in the form of a block diagram, the means 28 for the processing of the signals coming from the card are placed in a network link with the other means forming the data-processing means 21. For, in certain cases, especially depending on the operating system used in the vocal server 18, it is impossible to place the signal processing means as a resource. In such cases, the signal processing means 28 are placed in a network on a computer 50. The digitized vocal file is then transferred through the local network 15a and processed by the computer in a network including the signal processing means 28. The results of the processing operation performed by the computer are sent to the vocal server in ASCII form or in another form through the local network 15a.

Figure 5:
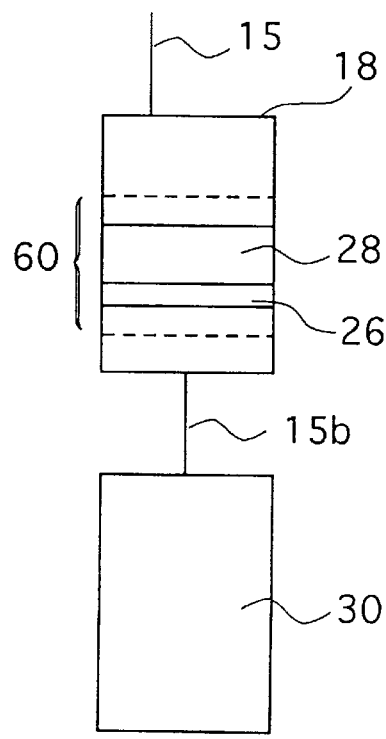
FIG. 5 gives a view, in the form of a block diagram, of a fourth alternative embodiment such that said means for the processing of the signals coming from the card are integrated with the other means forming the data-processing means.

According to the fourth embodiment shown in FIG. 5, in the form of a block diagram, the means 28 for the processing of the signals coming from the card are integrated with other means forming the data-processing means 21. More specifically, these means 28 are integrated into the digital signal processor (DSP) 60 of the electronic card of the vocal server 18 with a logic circuit for calling up the functions of this specific DSP. It is also possible to replace the DSP of the local server by a specific DSP integrating the functions of the signal processing means 28.

Figure 6:
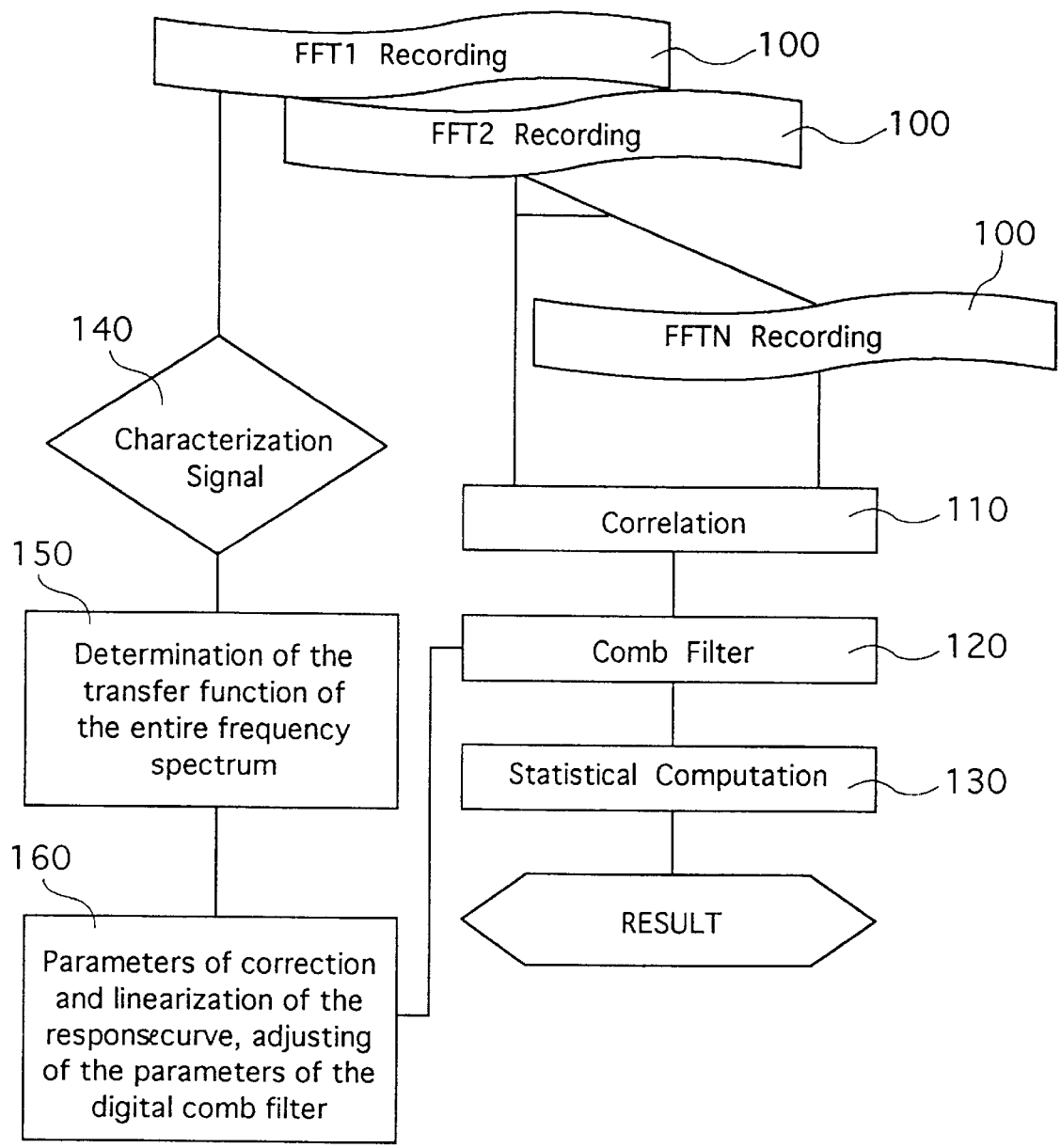
FIG. 6 gives a view, in the form of block diagrams, of the processing flow chart.

Referring to FIG. 6, a description shall now be given of the processing flow chart of the signal processing means 28. The structure of the signals received has fixed characteristics: perfect definition of all the frequencies transmitted, transmission time of each group of frequencies, number of signals to be received and duration of the total signal, predetermined signal corresponding to the calibration signal. The signal processing means therefore "know" what they have to search for. They apply a fast Fourier transform function (FFT) sliding in variable steps (FFT1, FFT2, . . . FFT N) 100 of low amplitude enabling (i) the establishment of a correlation function (110), (ii) the obtaining of a noise rejection, and (iii) the observation of each signal part on several FFT sections. For example, the working step could be 5 milliseconds for a unitary signal of 20 to 50 milliseconds.

Then, and in parallel, a digital comb filtering operation (120) is applied, the number of inputs and the functions of which can be parametrized. Finally, each result is compared and a statistical computation (130) enables the removal of doubt over certain signals. The predetermined characterization signal (140) corresponding to the calibrated signal uses a set of frequencies that is sufficient with respect to the frequencies that the card 10 may send out. It is thus possible to obtain a status report on the distortions, damping, drifts, energy, noise levels and echoes, etc. for the entire onward transmission line on all the frequencies transmitted. Since the predetermination signal is known, it is not open to other interpretations. It enables the calibration of the signal processing means and makes it possible to determine the transfer function of the onward transmission line (150). The signals sent out by the card may therefore be corrected (160) with respect to the total response curve of the system. The signal processing means 28 are thus capable of processing different types of signals, whether these are monofrequency, bifrequency or multiple frequency signals, sent out at different speeds and having different values of duration, for it is enough to program them as a function of the signals (DTMF or other) to be detected.

What is claimed is:

1. A method enabling two populations of persons, one being sedentary and the other being nomadic to exchange data in a sure and speedy manner, said method comprising the following steps:

portable objects are placed at the disposal of the persons belonging to the nomadic population, these objects having a credit card format and being customized by specific identifiers for each person and for each card, said card is used to transmit at least partially encrypted DTMF type brief acoustic identification signals, the acoustic identification signals being transmitted by the card when it is activated by the person having it at his disposal, said acoustic identification signals are received by means of the microphone of a standard telephone set and said signals are processed by means of the standard telephone set so that the resulting signal can be transmitted through a telephone or computer network, the signal is transmitted onwards, through a telephone or computer communications network, to the data-processing service of at least one of the persons of the sedentary population, the reduced size and the format of the card, as well as the conditions of use of the card, such as the presence of aging microphones, poor acoustic coupling between the card and the microphone, ambient noise, temperature, etc., not permitting the onward transmission, in the present state of the art, of DTMF acoustic signals having a quality of such that the signal received can always be exploited, as it is, by the vocal servers existing in the data-processing services, the signals coming from the card through the microphone, the standard telephone set and the communications network are corrected by a software program whose parameters are transmission parameters of a transfer function of transmission between said card and said data processing service, said transmission parameters being a function of the characteristics of the card, its conditions of use in combination with the microphone of the telephone set, characteristics of the communications network for signals of a particular type corresponding to the identification data transmitted, so that, after correction, the signals that come from the card and are received by the data-processing services contain the data that the nomadic population wishes to transfer to the sedentary population, the signals are decrypted and the data elements obtained after decryption are compared with the data elements, in the possession of the data-processing service, for the identification of the card and the holder of the card, so that, after the implementation of this sure and speedy process of identification, the persons of each of the two populations may exchange data in full security.

2. A method according to claim 1 wherein, to determine the parameters of the specific correction software program that corrects the signals coming from the card:

the card is used to transmit an acoustic signal predetermined to correspond to a calibrated signal, especially in frequency and in power, the received signal is analyzed by the data-processing service, in being compared with the calibrated acoustic signal, the parameters of the specific correction software program are deduced from this comparison.

3. A system enabling two populations of persons, one sedentary the other nomadic to exchange data in a sure and speedy manner, said system comprising:

portable objects placed at the disposal of the persons belonging to the nomadic population, said portable objects being cards having a credit card format and which are customized by specific identifiers for each person and each card, said card comprising means for the transmission of at least partly encrypted DTMF type brief acoustic identification signals, the acoustic identification signals being transmitted by the card when it is activated by the person having it at his disposal, by means of at least one element accessible from the exterior of the card, a standard telephone set comprising:
  a microphone against which the person having the card at his disposal places this card when the acoustic identification signal is transmitted,
  means for the standard processing of said acoustic identification signals so that the resulting identification signal can be transmitted onwards to a distance, through a telephone communications network, by transmission means, a data-processing service comprising data-processing means at the disposal of at least one of the persons of the sedentary population, connected to the telephone communications network and liable to receive the identification signal coming from the telephone set, the reduced size and the format of the card as well as the conditions of use of the card, such as the presence of aging microphones, poor acoustic coupling between the card and the microphone, ambient noise, temperature, etc., not permitting the onward transmission, in the present state of the art, of DTMF acoustic signals of a quality such that the signal received can always be exploited, as it is, by the vocal servers existing in the data-processing services, said data-processing means comprising:
means for correcting the signals coming from the card, through the microphone, the standard telephone set or the communications network, comprising a specific correction software program whose parameters are transmission parameters of a transfer function of transmission between said card and said data processing service, said transmission parameters being a function of the characteristics of the card, its conditions of use in combination with the microphone of the telephone set, characteristics of the communications network for signals of a particular type corresponding to the identification data transmitted, so that after correction, the signals that come from the card and are received by the data-processing services contain the data elements that the nomadic population wishes to transfer to the sedentary population, means for the decryption of the signals making it possible, through these signals, to obtain the specific identifiers of the card and of the person holding the card, a database containing the references of the cards and of the persons having these cards at their disposal and their identification data, means for the comparison of the specific identifiers of the card and of the person holding the card with the identification data of the card and the person holding the card, contained in the database, so that, after the implementation of this speedy and sure process of identification, the persons of each of the two populations may exchange data in full security.

4. A system according to claim 3, wherein to determine the parameters of the specific correction software program that corrects the signals coming from the card:

the transmission means of the card send out a predetermined acoustic signal to correspond to a calibrated signal, especially in frequency and in power, the data-processing means of the data-processing service comprise means for the analysis of the signal received by the data-processing service and for the comparison of this signal with the calibrated acoustic signal.

5. A system according to claim 3, wherein said means for the correcting of the signals coming from the card are placed upline with respect to the other means forming the data-processing means.

6. A system according to claim 3, wherein:
said means for the correcting of the signals coming from the card are placed as resources for the other means forming the data-processing means.

7. A system according to claim 3, wherein said means for the correcting of the signals coming from the card are placed in a network with respect to the other means forming the data-processing means.

8. A system according to claim 3, wherein said means for the correcting of the signals coming from the card are integrated with the other means forming the data-processing means.

9. A system according to claim 3, wherein:
the card comprises encryption means enabling the acoustic signals to be varied from one operation to another.

10. A method enabling two populations of persons, one being stationary and the other being mobile, to exchange data in a sure and speedy manner, the method comprising:

providing a portable card having a credit card format to a user in the mobile population, the card being customized by specific identifiers identifying the user and the card, transmitting at least partially encrypted DTMF type brief acoustic identification signals from the card upon activation by the person to whom it is provided, receiving the acoustic identification signals by a microphone and processing the received signals so that a resulting signal is transmittable through a communications network, transmitting the signal through a communications network to a data processing service of the stationary population, determining transmission parameters of a transfer function of transmission between said card and said data processing service by receiving and analyzing a calibration signal transmitted by the card, correcting the signal received by the processing service using the transmission parameters so as to permit exploitation of the DTMF signals transmitted by the card even under poor acoustic transmission conditions, decrypting data elements received from the user and comparing the decrypted data elements with the stored data elements to determine identity of the user, so as to ensure secure communications between the stationary population and the identified user.

11. A method according to claim 10 further comprising transmitting a calibration signal having a predetermined frequency and power from the card, receiving the calibration signal from the card, comparing the received calibration signal with a reference calibration signal and determining the transmission parameters from the comparison.

12. A system to enable a stationary population of persons to exchange data with a mobile user over a communications network, comprising:

a card, portable for use by the user, having a credit-card format and customized by specific identifiers identifying the user and the card, the card including an acoustic transmitter to transmit an acoustic identification signal that is at least partly DTMF-type encrypted, the acoustic identification signal including a calibration signal of known power and frequency, and an activation element accessible from an exterior surface of the card to activate transmission of signals by the card, the card being acoustically connectable to the communications network, and a data-processing service connectable to the communications network including data processor controllable by a member of the stationary population to receive the identification signal transmitted by the card, the data processor including an input processor to receive the calibration signal from the card and generate transmission parameters in response to the calibration signal, the data processor adapted to correct signals received from the card according to the transmission parameters and further including a decryptor to decrypt signals received from the card and obtain the identifiers of the card and of the user, a database containing references of a number of possible cards and users and their respective identification data, and a comparator to compare the identifiers of the card and the user respectively with the identification data of the card and user contained in the database.

13. A system according to claim 12, wherein the input processor includes means for comparing the calibration signal of this signal with a reference acoustic signal.

14. A system according to claim 12, wherein the input processor is placed upline with respect to other elements of the data-processor so as to be first to receive the signal receive the identification signal.

15. A system according to claim 12, wherein the input processor is connected as a resource to other elements of the data-processor.

16. A system according to claim 12, wherein the input processor is disposed in a network with respect to other elements of the data-processor.

17. A system according to claim 12, wherein the input processor is integrated with the other elements of the data-processor.

18. A system according to claim 12, wherein the card includes an encryptor to enable the acoustic identification signals to be varied from one operation to another.

19. A system according to claim 12, further comprising a telephone set having a microphone, the card being placeable against the microphone so that the microphone receives the acoustic identification signal from the card and an acoustic signal processor to process the acoustic identification signals so that a resulting identification signal is transmittable through the communications network to the data processing service.

* * * * *